Oct. 25, 1955 J. G. SPRACKLEN 2,721,895

TELEVISION RECEIVER

Original Filed Sept. 15, 1951 2 Sheets-Sheet 1

JOHN G. SPRACKLEN
*INVENTOR.*

BY Francis W. Crotty

HIS ATTORNEY

Oct. 25, 1955 J. G. SPRACKLEN 2,721,895

TELEVISION RECEIVER

Original Filed Sept. 15, 1951 2 Sheets-Sheet 2

JOHN G. SPRACKLEN
*INVENTOR.*

BY Francis W. Crotty

HIS ATTORNEY.

United States Patent Office 2,721,895

Patented Oct. 25, 1955

2,721,895

TELEVISION RECEIVER

John G. Spracklen, Chicago, Ill., assignor to Zenith Radio Corporation, a corporation of Illinois Original application September 15, 1951, Serial No. 246,768. Divided and this application December 3, 1952, Serial No. 323,752

14 Claims. (Cl. 178—69.5)

This invention relates to television receivers and more particularly to synchronizing and automatic gain control systems for use in such receivers. This application is a division of copending application Serial No. 246,768, filed September 15, 1951, for "Television Receiver," and assigned to the present assignee.

In the copending applications of Robert Adler, Serial No. 139,401, filed January 19, 1950, for "Electron-Discharge Devices," now U. S. Patent No. 2,606,300, issued August 5, 1952, and Serial No. 139,402, filed January 19, 1950, for "Synchronizing-Control Apparatus," now abandoned in favor of continuation-in-part applications Serial No. 267,826, filed January 23, 1952, now U. S. Patent No. 2,684,404, issued July 20, 1954, and Serial No. 260,221, filed December 6, 1951, all assigned to the present assignee, there are disclosed and claimed a novel electron-discharge device and system for use as a synchronizing-control system in a television receiver or the like. In the preferred embodiment, a two-section tube is employed, the first section operating as a synchronizing-signal clipper and balanced line-frequency phase-detector to develop between a pair of anodes a balanced unidirectional control voltage indicative of the phase difference between the local line-frequency oscillator and the incoming line-frequency synchronizing-signal pulses. In the other section of the tube, a beam is simultaneously subjected to a sinusoidal magnetic-deflection field energized from the line-frequency sweep output and to a slow lateral displacement in accordance with the balanced unidirectional control voltage developed between the two phase-detector anodes in the other section. In this manner, the duty cycles of the two final anodes in the second section of the tube vary in accordance with the unidirectional control potential developed between the phase-detector anodes in the first section. Either the leading edge or the trailing edge of the developed quasi-square wave is employed to drive the line-frequency sweep system. The output voltages appearing at the phase-detector anodes may be combined and integrated to provide field-frequency output pulses for controlling the field-frequency sweep system, or a separate anode may be provided for this purpose. Thus, a single tube, together with a small number of external circuit elements, performs the several functions of synchronizing-signal separator, automatic frequency control phase detector, line-frequency oscillator, and reactance tube, thus providing a substantial saving in comparison with conventional systems employing three or more tubes to perform these functions. However, a synchronizing-control tube of this type is of relatively complex construction and requires the use of an external magnetic field energized from the output of the line-frequency sweep system.

In the copending application of Robert Adler, Serial No. 242,509, filed August 18, 1951, for "Television Receiver," and assigned to the present assignee, there are disclosed and claimed a novel tube and system for obtaining both noise-immune synchronizing-signal separation and gated automatic gain control generation. In a preferred form of this system, a sheet-like electron beam of substantially rectangular cross-section is projected through a deflection-control system toward a target electrode which is provided with a pair of apertures and is followed by plate electrodes for collecting space electrons which pass through the respective apertures. Detected composite video signals are applied to the deflection-control system in such a manner that space electrons are permitted to pass through the two apertures in the target electrode only during synchronizing-pulse intervals. Moreover, extraneous noise impulses, which are generally of much greater amplitude than the desired synchronizing pulses, cause transverse deflection of the beam beyond the apertures so that space electron flow to the plate electrodes is again interrupted. One of the plate electrodes is employed to derive noise-immune output pulses corresponding to the synchronizing-pulse components of the applied composite video signals, and these output pulses are employed to drive the line-frequency and field-frequency scanning systems. A keying signal, derived from the line-frequency and/or field-frequency scanning system, is applied to the other plate electrode to obtain a gated automatic gain control potential which is then applied in a conventional manner to one or more of the early receiving stages. In order to insure the establishment of synchronizing-pulse output at the first plate electrode by the time the automatic gain control system goes into effect to limit further growth of the signal, the two apertures in the target electrode are disposed in overlapping alignment in a direction parallel to the plane of the sheet-like electron beam. In addition to providing noise-immune synchronizing-signal separation and automatic gain control generation in a single tube, this system has the important advantage of automatically establishing the correct synchronizing-pulse clipping level for all receiver-input signal levels, with the result that incorrect synchronizing-pulse clipping which might otherwise be caused by drift or misadjustment of the automatic gain control circuits is effectively precluded.

While each of these two systems individually permits receiver simplification by virtue of a combination of functions in a single electron-discharge tube, and while each results in improved receiver operation in some respects, the two systems do not readily lend themselves to consolidation in a single multi-purpose tube. The synchronizing-control system described in the first-mentioned Adler applications requires magnetic deflection of a beam which has been gated by the incoming synchronizing-pulses to obtain automatic-frequency-control phase-detection. On the other hand, electrostatic deflection is employed in the combined synchronizing-signal separator and automatic gain control generator of the last-mentioned Adler application, and it is not feasible to restrict a magnetic-deflection field to that portion of the beam trajectory which follows the apertured target electrode. This consideration alone would prevent facile incorporation of the two systems in a single envelope. Moreover, to obtain the desired phase detection in the synchronizing-control system, the electron beam should originate at a fixed source, while the effective origin of the beam passing through the apertured target electrode in the combined synchronizing-signal separator and automatic gain control generator may be anywhere within the synchronizing-pulse clipping aperture. Even if these difficulties could be overcome, the resulting structure would be complex and not as well adapted to economical mass production techniques as the subject invention.

It is therefore an important object of the present invention to provide an improved system for performing the several functions of noise-immune synchronizing-signal separator, balanced automatic-frequency-control phase-detector, line-frequency oscillator, reactance tube, and gated automatic gain control generator in a television receiver or the like.

It is a further object of the invention to achieve this desired objective while at the same time effecting a substantial cost reduction in the apparatus required to perform these functions.

The features of the present invention which are believed to be novel are set forth with particularity in the appended claims. The invention, together with further objects and advantages thereof, may best be understood, however, by reference to the following description taken in connection with the accompanying drawings, in the several figures of which like reference numerals indicate like elements, and in which:

Throughout the specification and the appended claims, the term "composite television signal" is employed to describe the received modulated carrier signal, while the term "composite video signal" is used to denote the varying unidirectional signal after detection.

Figure 1:
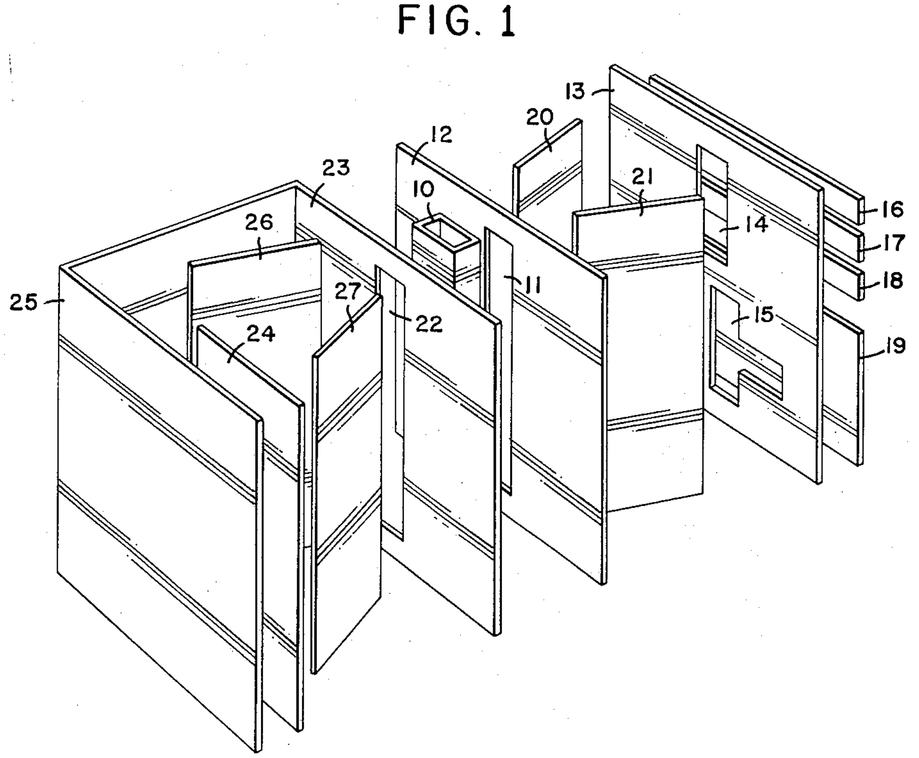
Figure 1 is a perspective view of the electrode system of a new and improved electron-discharge device constructed in accordance with the present invention.

In the perspective view of Figure 1, which illustrates the essential elements of an electron-discharge device of preferred construction in accordance with the invention, two separate sheet-like electron beams of substantially rectangular cross-section are projected from opposite electron-emissive surfaces of a common elongated cathode 10 which is provided with an indirect heater element (not shown). In the right-hand half of the tube, as viewed in Figure 1, space electrons originating at cathode 10 are projected through a slot 11 in an accelerating electrode 12 toward a target electrode or intercepting anode 13 which is provided with a pair of apertures 14 and 15 in overlapping alignment in a direction parallel to cathode 10. Three plate electrodes 16, 17 and 18 are provided for collectively receiving space electrons which pass through aperture 14, and an additional plate electrode 19 is provided for receiving space electrons which pass through aperture 15. A deflection-control system, illustrated as a pair of electrostatic-deflection plates 20 and 21, is provided between accelerating electrode 12 and intercepting anode 13. Preferably the tube is so constructed and operated that the width of the beam at the plane of target electrode 13 is less than that of aperture 14.

In the left-hand half of the tube, as viewed in Figure 1, electrons originating at cathode 10 are projected through a slot 22 in an accelerating electrode 23 toward a pair of anodes 24 and 25 respectively having active portions on opposite sides of the undeflected path of this second beam. A pair of electrostatic-deflection plates 26 and 27 are provided between slot 22 and anodes 24 and 25.

In operation, the transverse deflection field established by deflection plates 20 and 21 is adjusted to direct the electron beam in the right-hand section of the tube to an electron-impervious portion of target electrode 13, for example, to a solid portion of electrode 13 on the side of aperture 14 nearer deflection plate 20. When an input signal of positive polarity is applied to deflection plate 21, or alternatively when an input signal of negative polarity is applied to deflection plate 20, the beam is deflected at least partially into apertures 14 and 15 whenever the input signal reaches a predetermined amplitude level. During such intervals, current is permitted to flow in the output circuits associated with plate electrodes 16, 17, 18 and 19, while during other intervals no such current flow can occur. Moreover, when the input signal exceeds a predetermined higher amplitude, the beam is deflected beyond aperture 14 of intercepting anode 13, and current flow to plate electrodes 16, 17 and 18 is again interrupted. At still greater amplitudes, the current flowing through plate electrode 19 is first reduced and then extinguished as the beam sweeps from the wide portion to the narrow portion of aperture 15 and beyond. Consequently, if plate electrodes 16, 17 and 18 each have equal receptive areas, the transfer characteristic of the deflection-control system with respect to each of these plate electrodes is substantially that represented by curve 30 of Figure 2, in which the current $i_p$ flowing to plate electrode 16, 17, or 18 is plotted as a function of the input voltage $e_i$ applied to the deflection-control system. The transfer characteristic of the deflection-control system with respect to plate electrode 19 is determined by the geometry of aperture 15 in target electrode 13 and, for the illustrated construction, may be represented by curve 31 of Figure 2.

The left-hand portion of the structure of Figure 1 constitutes a conventional deflection-control electrode system. The electron beam projected through slot 22 of accelerating electrode 23 is directed either to anode 24 or to anode 25 in accordance with the instantaneous potential difference between electrostatic-deflection plates 26 and 27. Thus, if a sinusoidal signal is applied between deflection plates 26 and 27, the beam is caused cyclically to sweep back and forth between anode 24 and anode 25. Consequently, since full beam current is switched from one anode to the other in a relatively small fraction of a cycle, oppositely phased square-wave output signals are produced in load circuits respectively associated with output anodes 24 and 25; in the preferred embodiment of the invention, only one square-wave output signal is required, and either anode 24 or anode 25 is employed to develop the output signal while the other is directly connected to accelerating electrode 23.

The two electrode systems are combined in a single tube structure as shown in Figure 1 and are arranged to cooperate with each other in a particular manner to be hereinafter described in detail. Specifically, the combined tube structure of Figure 1 is particularly well adapted to serve as a combined noise-immune synchronizing signal separator, balanced automatic-frequency-control phase-detector, line-frequency oscillator, reactance tube, and gated automatic gain control generator in a television receiver or the like.

In Figure 1, only the essential elements of the electrode system are illustrated. Refinements of this system may be made in accordance with well-known practices in the art. Thus, for example, a plate having a slot narrower than the emissive surface of cathode 10 may be interposed between cathode 10 and either or both of accelerating electrodes 12 and 23 and maintained at or near cathode potential to restrict electron emission to a narrow central portion of the respective emissive surfaces of cathode 10. Moreover, it may be advantageous to include one or more suppressor electrodes between intercepting anode 13 and plate electrodes 16, 17, 18 and 19. The particular form of deflection-control means employed in the right-hand half of the structure of Figure 1 is not essential to the present invention; one or both of the deflection plates 20 and 21 may be replaced by several electrodes biased at different potentials which may correspond for example to cathode potential and the D. C. supply voltage of the associated apparatus with which the tube is employed. Moreover, either or both of the sheet-like electron beams may be split into two or more beams subjected to a common transverse deflection field, and such an arrangement is to be considered within the scope of the appended claims.

The electrode system is mounted within a suitable envelope (not shown) which may then be evacuated, gettered and based in accordance with well known procedures in the art. The entire structure may conveniently be included in a miniature tube envelope, a number of the electrode connections being made internally of the envelope in a manner to be described hereinafter for the purpose of minimizing the number of required external circuit connections.

In accordance with the present invention, a beam deflection tube of the type shown and described in connection with Figures 1 and 2 may be employed in a television receiver in the manner schematically illustrated in Figure 3. Incoming composite television signals are intercepted by an antenna 40 and translated by receiving circuits, including a radio-frequency amplifier 41, an oscillator-converter 42 and an intermediate-frequency amplifier 43, to a video detector 44. Detected composite video signals from detector 44 are impressed on the input circuit of a cathode-ray tube 45 or other suitable image-reproducing device through first and second video amplifiers 46 and 47. Intercarrier sound signals from first video amplifier 46 are detected and amplified by conventional sound circuits 48 and impressed on a loudspeaker 49 or other suitable sound-reproducing device.

Composite video signals from first video amplifier 46 are also impressed on a synchronizing system and automatic gain control generator, generally designated by the reference number 50, by means of a resistive voltage divider comprising resistors 51 and 52, the junction between these resistors being connected to one deflection plate 21 in the right-hand section of a beam deflection tube 53 of the type shown and described in connection with Figures 1 and 2. Cathode 10 of device 53 is connected to ground, and accelerating electrodes 12 and 23, target electrode 13, and second anode 25 of the left-hand section of device 53 are connected together (preferably internally of the envelope) and to a suitable source of unidirectional operating potential conventionally designated B+. Deflection plate 20 is connected to a tap on a voltage divider comprising resistors 54 and 55 connected between B+ and ground and is by-passed to ground by means of a condenser 56. Plate electrode 16 is connected to B+ through a load resistor 57 and is also coupled by means of an integrator 58 to a field-frequency scanning system 59 which provides suitable deflection currents to a field-frequency deflection coil 60 associated with image-reproducing device 45.

The synchronizing system also comprises a line-frequency sweep system 61, which may include a discharge tube and a power output stage, for impressing suitable deflection currents on the line-frequency deflection coil 62 associated with image-reproducing device 45. Plate electrodes 17 and 18 of device 53 are coupled to opposite terminals of a coil 63, having a grounded center tap 64, by means of respective anticipatory and anti-shunt networks comprising shunt connected resistor-condenser combinations 85 and 86 and condensers 65 and 66. Condenser 67 is connected in parallel with coil 63, and a pair of series-connected resistors 68 and 69 are connected between plate electrodes 17 and 18, the junction 70 between resistors 68 and 69 preferably being connected to the positive terminal of a suitable source of unidirectional bias potential, here shown as a battery 71, the negative terminal of which is grounded. Coil 63 is inductively coupled to a coil 72 connected in series between line-frequency sweep system 61 and line-frequency deflection coil 62.

Plate electrodes 17 and 18 are directly connected to electrostatic-deflection plates 27 and 26 respectively in the left-hand section of device 53, and anode 24 is connected to B+ through a load resistor 73 and to line-frequency sweep system 61 through a differentiating network comprising a series condenser 74 and a shunt resistor 75.

Line-frequency sweep system 61 is also coupled to plate electrode 19 by means of a series condenser 76 and a shunt resistor 77. Plate electrode 19 is coupled to the AGC lead 78 by means of resistor 77 and an integrating network comprising a series resistor 79 and a shunt condenser 80, and AGC lead 78 is connected to one or more of the receiving circuits comprising radio-frequency amplifier 41, oscillator-converter 42, and intermediate-frequency amplifier 43.

In operation, positive-polarity composite video signals, including the direct-voltage components, from the output circuit of first video amplifier 46 are applied to deflection plate 21 by means of the voltage divider comprising the series combination of resistors 51 and 52. It is unnecessary to provide a voltage-divider action for the alternating components of the composite video signals; consequently, resistor 51 may be by-passed for signal frequencies by means of a condenser 81 if desired. Deflection plates 20 and 21 are so biased that the beam projected through aperture 11 of accelerating electrode 12 is normally directed to an electron-impervious portion of intercepting anode 13, as for instance, to a solid portion of anode 13 on the side of apertures 14 and 15 nearer deflection plate 20. Application of the positive-polarity composite video signals to deflection plate 21 causes a transverse deflection of the beam in accordance with the instantaneous signal amplitude. The operating potentials for the various electrodes are so adjusted that different longitudinal portions of the beam are respectively deflected entirely into aperture 14 and partially into aperture 15 of intercepting anode 13 in response to the synchronizing-signal components of the applied composite video signals; the beam is entirely intercepted by anode 13 during video-signal intervals. As a consequence, plate current is only permitted to flow to plate electrodes 16, 17, 18 and 19 during synchronizing-pulse intervals. Since plate electrode 16 is maintained at a positive bias voltage by means of its connection to B+ through load resistor 57, the synchronizing-pulse components of the applied composite video signal are translated to load resistor 57. These pulse components are integrated by means of integrator 58 to provide field-frequency driving pulses for scanning system 59. In other words, plate electrode 16 is employed solely to derive field-frequency output pulses for effecting field-frequency receiver synchronization.

The left-hand section of device 53 serves as a line-frequency oscillator in the line-frequency scanning system. Oppositely phased sinusoidal signals are applied to deflection plates 26 and 27 by means of coil 63 and condenser 67 which are tuned to the line-scanning frequency and which are excited by means of coil 72 inserted in series with the line-frequency deflection coil 62. Consequently, the beam in the left-hand section of device 53 is caused to sweep back and forth between anodes 24 and 25, so that a square-wave output voltage is developed across resistor 73. This square-wave output voltage is differentiated by means of condenser 74 and resistor 75, and the resulting positive-polarity or negative-polarity pulses are employed to trigger line-frequency sweep system 61, depending on the construction of that sweep system.

At the same time, the same oppositely phased sinusoidal voltage waves applied to deflection plates 27 and 26 are impressed on plate electrodes 17 and 18 respectively in the right-hand section of device 53. As previously mentioned, current flow to plate electrodes 17 and 18 is restricted to synchronizing-pulse intervals by virtue of the geometry of target electrode 13. Current flow to plate electrodes 17 and 18 is further dependent upon the instantaneous potential of these electrodes during the synchronizing-pulse intervals. The oppositely phased sinusoidal signals developed by coil 63 and condenser 67 serve as comparison signals in a balanced automatic-frequency-control phase-detector. If the comparison signals are properly phased with respect to the incoming line-frequency synchronizing-signal pulses, the instantaneous potentials of plate electrodes 17 and 18 are equal at the time of the arrival of each synchronizing pulse, and no unidirectional control potential difference is developed between these plate electrodes. On the other hand, if the comparison signals and the incoming line-frequency synchronizing-signal pulses are not in phase synchronism, the instantaneous potentials of the two phase-detector plate electrodes 17 and 18 at the time of arrival of each line-frequency synchronizing-signal pulse are different, so that a unidirectional control signal is developed between plate electrodes 17 and 18. Since these plate electrodes are directly connected to deflection plates 27 and 26 respectively in the left-hand section of device 53, the beam in the left-hand section is accelerated or retarded in its progress from anode 24 to anode 25 and back. As a result, the positive and negative half cycles of the output voltage wave developed across resistor 73 are altered in time duration, and the quasi-square wave thus developed is differentiated to provide triggering pulses for line-frequency sweep system 61. In order to obtain the desired automatic-frequency-control action, it is essential that a condition in which the comparison signals lag the incoming synchronizing-signal pulses result in an increase in the frequency of the local oscillator comprising the left-hand section of device 53, line-frequency sweep system 61, and feedback circuit 72, 63. This operation is insured by the common direct connections for both the sinusoidal comparison signals and the unidirectional AFC potential from plate electrodes 17 and 18 to deflection plates 27 and 26 respectively. It is possible, for a given construction of sweep system 61, that the system may fail to oscillate altogether due to incorrect phasing of the comparison signals and the triggering pulses for the line-frequency sweep system; this condition may be corrected by merely reversing the terminal connections of feedback coil 72 or of coil 63, or, if separate leads are provided for anodes 24 and 25, by reversing the circuit connections of these two anodes. Proper pull-in action is automatically insured for any condition for which oscillation is obtained.

A suitable keying signal, which may comprise positive-polarity line-frequency retrace pulses or other suitably phased signals bearing a fixed phase relation to the line-frequency scansion of image-reproducing device 45, is applied from line-frequency sweep system 61 to plate electrode 19 by means of condenser 76 and resistor 77. This keying signal performs a gating function, permitting plate electrode 19 to accept space electrons passing through aperture 15 of intercepting anode 13 only during those intervals when plate electrode 19 is instantaneously positive. Consequently, a control potential is developed across resistor 77 in response to time coincidence of the synchronizing-signal components of the composite video signals and a positive-polarity keying signal applied to plate electrode 19. This control potential is integrated by means of resistor 79 and condenser 80 to provide a negative-polarity unidirectional control potential for application to the AGC lead 78.

Certain important advantages of the system described in connection with Figure 3 may best be understood by consideration of that figure in connection with Figures 1 and 2. Since aperture 14 in intercepting anode 13 has definite fixed boundaries, it is apparent that deflection of the beam beyond aperture 14 results in interception thereof by anode 13. Consequently, extraneous noise pulses, which are generally of much larger amplitude than any desired component of the composite video signals, are not translated to plate electrodes 16, 17 and 18. Thus, loss of synchronization due to extraneous impulse noise is substantially precluded. This operation is apparent from the operating characteristic 30 of Figure 4. When composite video signals comprising synchronizing-pulse components 32 and video-signal components 33 are impressed on deflection plate 21, extraneous noise pulses 34 and 35, which are of greater amplitude than the synchronizing-pulse components by an amount exceeding the voltage represented by the spacing between vertical lines 36 and 37, result in deflection of the beam beyond aperture 14; consequently, these noise pulses are not translated to the output circuits associated with plate electrodes 16, 17 and 18, and substantial noise immunity is achieved. Aperture 14 is preferably of constant length in a direction parallel to cathode 10, in order to provide output pulses of constant amplitude for application to scanning system 59 and to permit balanced operation of phase-detector plates 17 and 18.

Figure 2:
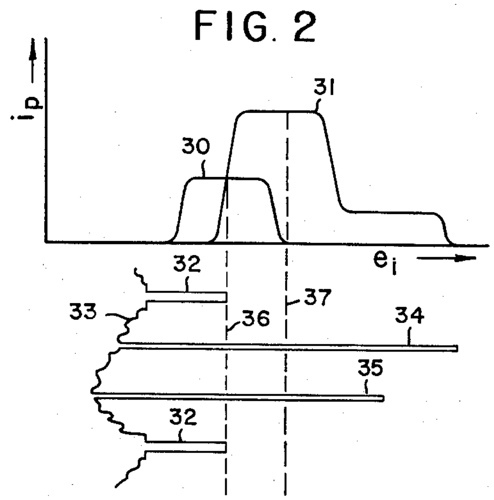
Figure 2 is a graphical representation of certain operating characteristics of the tube shown in Figure 1.

The operation of the gated automatic gain control system may perhaps best be understood by a consideration of operating characteristic 31 of Figure 2. Space electrons are permitted to pass to plate electrode 19 only when the electron beam is laterally deflected at least partially into aperture 15, and then only if plate electrode 19 is instantaneously maintained at a positive potential by the keying signal applied thereto from sweep system 61. In an equilibrium condition, the deflection-control system is so biased that the peaks of the synchronizing-signal pulses are impressed on the rising portion of characteristic 31, as indicated by vertical line 36. When the signal amplitude increases, the peaks of the synchronizing pulses 32 instantaneously extend farther to the right, and the space current to plate electrode 19 is increased. This results in an increase in the negative unidirectional control potential applied to the receiving circuits 41, 42 and 43, thus reducing the gain of these circuits and thereby restoring the amplitude of the input signal applied to deflection plate 21 to the equilibrium value indicated in the drawing. On the other hand, if the signal amplitude instantaneously decreases, the negative gain-control potential decreases and the gain of the receiving circuits is increased to restore equilibrium. Noise pulses 34 and 35 occurring during the video signal intervals have no effect on the automatic gain control potential since plate electrode 19 is maintained at or below cathode potential during these intervals by the keying signal applied from sweep system 61. Moreover, even such noise pulses as may occur during synchronizing-pulse intervals, if of sufficiently great amplitude, are prevented from contributing to the automatic gain control potential by virtue of the finite boundaries of aperture 15. Consequently, even greater noise immunity is obtained with the present gated automatic gain control system than with conventional gated automatic gain control arrangements employing grid-controlled tubes for AGC generation.

Since it is desirable for the synchronizing pulses translated by way of plate electrode 16 and load resistor 57 to scanning system 59 to be of constant amplitude, it is preferred that the peaks of the synchronizing-pulse components 32 be impressed on characteristic 30 at a constant-current region of that characteristic; in other words, the synchronizing-pulse components of the applied composite video signals should cause deflection of the upper portion of the beam entirely into aperture 14. At the same time, because of the automatic gain control action, the peaks of the synchronizing-pulse components 32 are always superimposed on a sloping portion of characteristic 31; in other words, the synchronizing-pulse components of the applied composite video signals cause deflection of the lower portion of the beam only partially into aperture 15. By disposing apertures 14 and 15 in overlapping or staggered alignment in a direction parallel to cathode 10, as illustrated in Figure 1, it is insured that whenever the automatic gain control action establishes the equilibrium condition illustrated by the graphical representation of Figure 2, synchronizing pulses of constant amplitude are developed at plate electrode 16 for application to the field-frequency scanning system, and the clipping level of the synchronizing-signal separator is automatically adjusted to accommodate varying signal strengths at the receiver input.

When the receiver is first turned on, or during channel switching operations, the receiver circuits are conditioned for operation at full gain. If the signal to which the receiver is tuned under these conditions is a strong one, the beam in the right-hand section might be swept beyond the AGC aperture 15 thus paralyzing the automatic gain control system unless special precautions are taken to provide for the establishment of a suitable negative automatic gain control potential in the first instance. Consequently, it is preferred to make aperture 15 of considerably larger transverse extent than aperture 14. Such a construction however, detracts at least partially from the immunity of the automatic gain control system to extraneous noise impulses occurring during synchronizing-pulse intervals. Consequently, it is preferred to make aperture 15 of varying length in a direction parallel to the cathode 10, in order to avoid paralysis of the receiver when the set is initially turned on or during channel switching operations, while at the same time providing at least partial noise immunity during synchronizing-pulse intervals. In the specific arrangement shown and described in connection with Figure 1, a T-shaped aperture 15 is employed. Such a construction permits the flow of at least some space current to plate electrode 19 under strong signal conditions when the receiver is first turned on, so that a negative automatic gain control potential is produced to reduce the gain of the receiving circuits and establish the equilibrium condition represented by Figure 2. Even if aperture 15 is of constant length in a direction parallel to the cathode, however, the noise immunity of the gated automatic gain control system is fully equivalent to that obtained with conventional systems now employed in commercially produced receivers.

Figure 3:
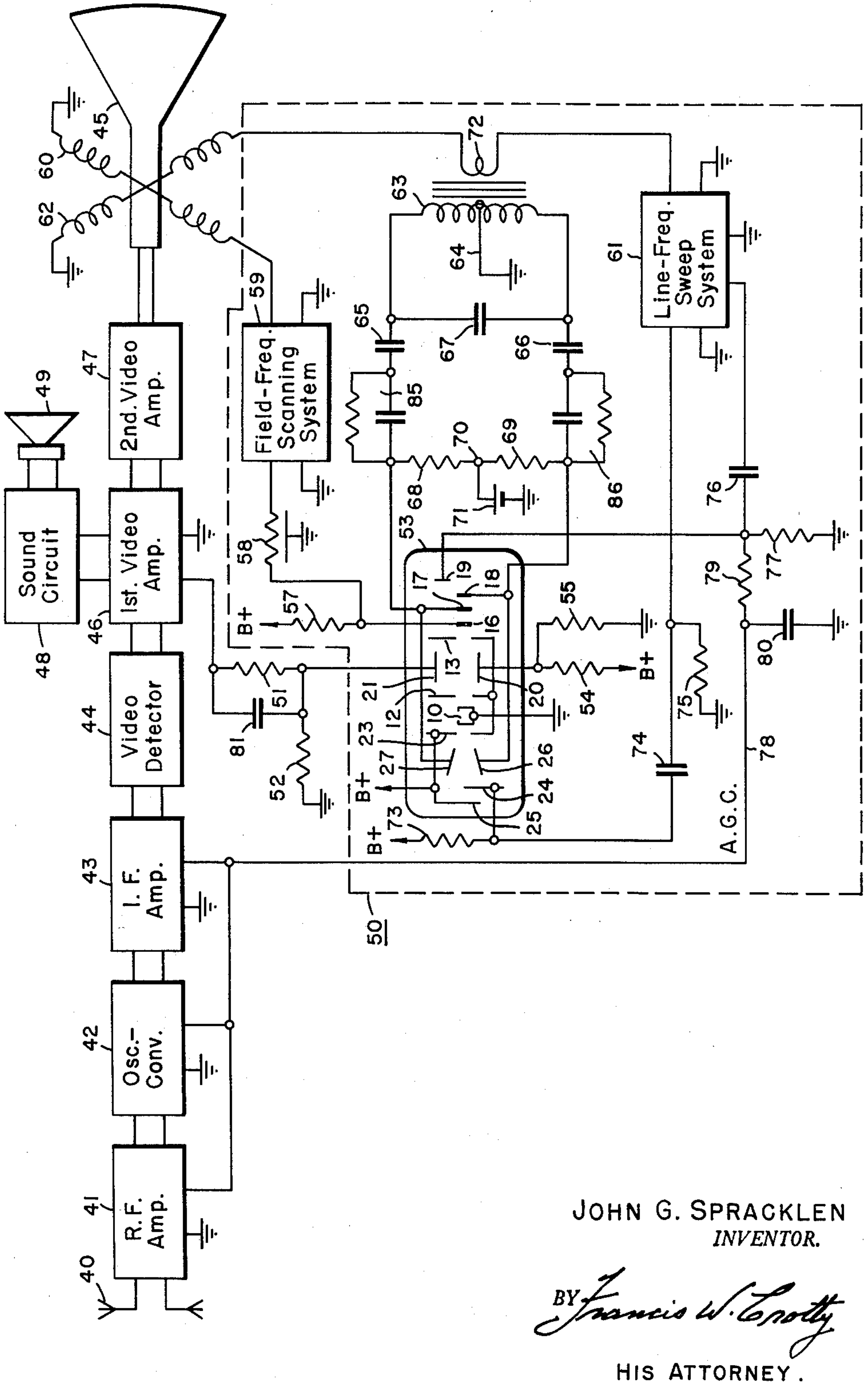
Figure 3 is a schematic diagram of a television receiver embodying the present invention.

Another important advantage of the system of Figure 3 is attributable to the particular mechanism employed for effecting automatic frequency control of the line-frequency scanning system. As previously explained, the desired automatic-frequency-control action is accomplished by applying two sinusoidal comparison signals in push-pull to the phase-detector plate electrodes 17 and 18. For a condition of phase synchronism with the incoming line-frequency synchronizing-signal pulses, the time of arrival of the incoming synchronizing pulses coincides with the passage of both phase-detector plate electrodes 17 and 18 through zero potential. If both phase-detector plate electrodes operated as perfect peak detectors, and if the incoming line-frequency synchronizing pulses were of infinitesimal duration, the phase-detector plate electrodes would acquire cathode potential at the precise instant of arrival of each incoming line-frequency synchronizing pulse; this condition would hold even for slight deviations from phase synchronism within the lock-in range. Since the space current in the left-hand section of the device 53, which operates as the local line-frequency oscillator, switches from one to the other of anodes 24 and 25 at the instant when the two electrostatic-deflection plates 26 and 27 are at equal potentials, the driving pulse for the line-frequency sweep system 61, and consequently the line-frequency retrace pulse, are initiated at that time. Consequently, within the lock-in range, the position of the reproduced image on the screen of device 45 would be completely insensitive to adjustment of the automatic frequency control system. In practice, the incoming line-frequency synchronizing-signal pulses are of such short duration and the plate electrodes 17 and 18 may so nearly approach perfect peak detector operation that this desirable condition may be very nearly attained.

Thus, it is apparent that the present invention provides new and improved apparatus for performing a multiplicity of functions in the synchronizing system of a television receiver or the like. With a single tube of the type shown and described in connection with Figure 1, the several functions of noise-immune synchronizing-signal separator, balanced automatic-frequency-control phase-detector, line-frequency oscillator, reactance tube, and gated automatic gain control generator may be performed. In a conventional receiver, these operations require at least three electron-discharge devices, some of which are of duplex construction. Further, the present system requires an extremely small number of associated circuit components. The special beam deflection tube may be constructed entirely of simple punched sheet metal parts and is therefore readily adaptable to large scale commercial production. By virtue of the staggered arrangement of the receptive areas of the plate electrodes, the correct clipping level is automatically established for the synchronizing-signal separator for all receiver-input signal levels, and this advantageous characteristic is accomplished without requiring the use of any additional circuit elements. Incorrect synchronizing-signal separation due to drift or misadjustment of the automatic gain control circuits, as observed in conventional receivers, is thus rendered impossible. As a still further advantage, the position of the reproduced image on the screen of the image-reproducing device is substantially insensitive to the adjustment of the automatic-frequency-control system within the lock-in range.

While the desired operating characteristics are obtained in the right-hand section of the beam deflection tube of Figure 1 by employing an apertured target or intercepting anode backed by a plurality of plate electrodes, it is apparent that equivalent operation may be achieved by providing plate electrodes of a size, shape and space distribution corresponding to the areas of plate electrodes 16, 17, 18 and 19 exposed to the electron beam, followed by anode means for collecting space electrons not collected by such plate electrodes. In some of the appended claims, therefore, the output system is described as comprising one or more plate electrodes having specifically defined receptive areas, and this terminology is to be construed as descriptive of a tube employing either the apertured target construction shown in Figure 1 or the alternative construction described above. However, the apertured target construction is preferred for its simplicity and ease of manufacture.

In the tube and system shown and described in connection with Figures 1–3, a separate plate electrode is provided for developing field-frequency synchronizing-signal pulses for application to the field-frequency scanning system. It is also possible to derive the desired field-frequency output pulses by providing a suitable integrating load circuit between center tap 64 of coil 63 and ground, as described and claimed in the copending application of Robert Adler, Serial No. 260,221, filed December 6, 1951, for "Synchronizing Control Apparatus" and assigned to the present assignee. In this manner, the output currents to phase-detector plate electrodes 17 and 18 are effectively combined to provide the desired field-frequency output pulses which may then be employed to control the field-frequency scanning system. This modification of the system provides equivalent performance with an attendant simplification of the required tube construction.

While particular embodiments of the present invention have been shown and described, it is apparent that various changes and modifications may be made, and it is therefore contemplated in the appended claims to cover all such changes and modifications as fall within the true spirit and scope of the invention.

I claim:

1. In a television receiver for utilizing transmitted composite televison signals: an image-reproducing device; a scanning system for controlling the scansion of said device; receiving circuits for translating said composite television signals; a video detector for demodulating said translated composite television signals to provide composite video signals comprising video-signal components and synchronizing-signal components of amplitude greater than the maximum amplitude of said video-signal components; a beam deflection tube comprising an electron gun including an elongated cathode for projecting a sheet-like electron beam of substantially rectangular cross-section, a plurality of plate electrodes respectively having predetermined receptive areas, anode means for collecting space electrons not collected by said plate electrodes, and deflection-control means for normally directing said electron beam to said anode means and responsive to an input signal for subjecting said beam to a transverse deflection field; means coupled to said video detector for applying said composite video signals to said deflection-control means to cause transverse deflection of said beam at least partially onto said receptive areas in response to said synchronizing-signal components; means coupled to said scanning system for applying to one of said plate electrodes a comparison signal bearing a fixed phase relation to said scansion; an output circuit coupled to said one plate electrode for developing a first unidirectional control signal indicative of the instantaneous phase relation between said synchronizing-signal components and said comparison signal; means for utilizing said first control signal to effect phase synchronism of said scanning system with said synchronizing-signal components; means for energizing another of said plate electrodes to accept at least a portion of the space current directed thereto; an output circuit coupled to said other plate electrode for developing a second unidirectional control signal indicative of the instantaneous amplitude of said composite video signals; and means for applying said second control signal to said receiving circuits to effect automatic gain control of said receiver.

2. In a television receiver for utilizing transmitted composite television signals: an image-reproducing device; a scanning system for controlling the scansion of said device; receiving circuits for translating said composite television signals; a video detector for demodulating said translated composite television signals to provide composite video signals comprising video-signal components and synchronizing-signal components of amplitude greater than the maximum amplitude of said video-signal components; a beam deflection tube comprising an electron gun including an elongated cathode for projecting a sheet-like electron beam of substantially rectangular cross-section, a plurality of plate electrodes respectively having predetermined receptive areas, anode means for collecting space electrons not collected by said plate electrodes, and deflection-control means for normally directing said electron beam to said anode means and responsive to an input signal for subjecting said beam to a transverse deflection field; means coupled to said video detector for applying said composite video signals to said deflection-control means to cause transverse deflection of said beam at least partially onto said receptive areas in response to said synchronizing-signal components; means coupled to said scanning system for applying to a pair of said plate electrodes oppositely phased comparison signals in fixed phase relation with said scansion; an output circuit coupled to said pair of plate electrodes for developing a first unidirectional control signal indicative of the instantaneous phase relation between said synchronizing-signal components and said scansion; means for utilizing said first control signal to effect phase synchronism of said scanning system with said synchronizing-signal components; means for energizing another of said plate electrodes to accept at least a portion of the space current directed thereto; an output circuit coupled to said other plate electrode for developing a second unidirectional control signal indicative of the instantaneous amplitude of said composite video signals; and means for applying said second control signal to said receiving circuits to effect automatic gain control of said receiver.

3. In a television receiver for utilizing transmitted composite television signals: an image-reproducing device; a first scanning system for controlling the line-frequency scansion of said device; a second scanning system for controlling the field-frequency scansion of said device; receiving circuits for translating said composite television signals; a video detector for demodulating said translated composite television signals to provide composite video signals comprising video-signal components and line-frequency and field-frequency synchronizing signal components of amplitude greater than the maximum amplitude of said video-signal components; a beam deflection tube comprising an electron gun including an elongated cathode for projecting a sheet-like electron beam of substantially rectangular cross-section, a plurality of plate electrodes respectively having predetermined receptive areas, anode means for collecting space electrons not collected by said plate electrodes, and deflection-control means for normally directing said electron beam to said anode means and responsive to an input signal for subjecting said beam to a transverse deflection field; means coupled to said video detector for applying said composite video signals to said deflection-control means to cause transverse deflection of said beam at least partially onto said receptive areas in response to said synchronizing-signal components; an output circuit coupled to at least one of said plate electrodes and to said second scanning system for translating said field-frequency synchronizing signal components thereto; means coupled to said first scanning system for applying to a pair of said plate electrodes oppositely phased comparison signals in fixed phase relation with said line-frequency scansion; an output circuit coupled to said pair of plate electrodes for developing a first unidirectional control signal indicative of the instantaneous phase relation between said line-frequency synchronizing-signal components and said line-frequency scansion; means for utilizing said first control signal to effect phase synchronism of said first scanning system with said line-frequency synchronizing-signal components; means for energizing another of said plate electrodes to accept at least a portion of the space current directed thereto; an output circuit coupled to said other plate electrode for developing a second unidirectional control signal indicative of the instantaneous amplitude of said composite video signals; and means for applying said second control signal to said receiving circuits to effect automatic gain control of said receiver.

4. In a television receiver for utilizing transmitted composite television signals: an image-reproducing device; a first scanning system for controlling the line-frequency scansion of said device; a second scanning system for controlling the field-frequency scansion of said device; receiving circuits for translating said composite television signals; a video detector for demodulating said translation composite television signals to provide composite video signals comprising video-signal components and line-frequency and field-frequency synchronizing-signal components of amplitude greater than the maximum amplitude of said video-signal components; a beam deflection tube comprising an electron gun including an elongated cathode for projecting a sheet-like electron beam of substantially rectangular cross-section, a plurality of plate electrodes respectively having predetermined receptive areas, anode means for collecting space electrons not collected by said plate electrodes, and deflection-control means for normally directing said electron beam to said anode means and responsive to an input signal for subjecting said beam to a transverse deflection field; means coupled to said video detector for applying said composite video signals to said deflection-control means to cause transverse deflection of said beam at least partially onto said receptive areas in response to said synchronizing-signal components; means coupled to said first scanning system for applying to a pair of said plate electrodes oppositely phased comparison signals in fixed phase relation with said line-frequency scansion; an output circuit coupled to said pair of plate electrodes for developing a first unidirectional control signal indicative of the instantaneous phase relation between said line-frequency synchronizing-signal components and said line-frequency scansion; means for utilizing said first control signal to effect phase synchronism of said first scanning system with said line-frequency synchronizing-signal components; an output circuit coupled to a third one of said plate electrodes and to said second scanning system for translating said field-frequency synchronizing-signal components thereto; means for energizing another of said plate electrodes to accept at least a portion of the space current directed thereto; an output circuit coupled to said other plate electrode for developing a second unidirectional control signal indicative of the instantaneous amplitude of said composite video signals; and means for applying said second control signal to said receiving circuits to effect automatic gain control of said receiver.

5. In a television receiver for utilizing transmitted composite television signals: an image-reproducing device; a scanning system for controlling the scansion of said device; receiving circuits for translating said composite television signals; a video detector for demodulating said translated composite television signals to provide composite video signals comprising video-signal components and synchronizing-signal components of amplitude greater than the maximum amplitude of said video-signal components; a beam deflection tube comprising an electron gun including an elongated cathode for projecting a sheet-like electron beam of substantially rectangular cross-section, an anode having a pair of apertures, a pair of plate electrodes for collecting space electrons passing through one of said apertures, an additional plate electrode for collecting space electrons passing through the other of said apertures, and deflection-control means for normally directing said beam to an electron-impervious portion of said anode and responsive to an input signal for subjecting said beam to a transverse deflection field; means coupled to said video detector for applying said composite video signals to said deflection-control means to cause transverse deflection of said beam at least partially into said apertures in response to said synchronizing-signal components; means coupled to said scanning system for applying to said pair of plate electrodes oppositely phased comparison signals in fixed phase relation with said scansion; an output circuit coupled to said pair of plate electrodes for developing a first unidirectional control signal indicative of the instantaneous phase relation between said synchronizing-signal components and said scansion; means for utilizing said first control signal to effect phase synchronism of said scanning system with said synchronizing-signal components; means for energizing another of said plate electrodes to accept at least a portion of the space current directed thereto; an output circuit coupled to said additional plate electrode for developing a second unidirectional control signal indicative of the instantaneous amplitude of said composite video signals; and means for applying said second control signal to said receiving circuits to effect automatic gain control of said receiver.

6. In a television receiver for utilizing transmitted composite television signals: an image-reproducing device; a first scanning system for controlling the line-frequency scansion of said device; a second scanning system for controlling the field-frequency scansion of said device; receiving circuits for translating said composite television signals; a video detector for demodulating said translated composite television signals to provide composite video signals comprising video-signal components and line-frequency and field-frequency synchronizing-signal components of amplitude greater than the maximum amplitude of said video-signal components; a beam deflection tube comprising an electron gun including an elongated cathode for projecting a sheet-like electron beam of substantially rectangular cross-section, an anode having a pair of apertures, a plurality of plate electrodes for collecting space electrons passing through one of said apertures, an additional plate electrode for collecting space electrons passing through the other of said apertures, and electrostatic deflection-control means for normally directing said electron beam to an electron-impervious portion of said anode and responsive to an input signal for subjecting said beam to a transverse electrostatic deflection field; means coupled to said video detector for applying said composite video signals to said deflection-control means to cause transverse deflection of said beam at least partially into said apertures in response to said synchronizing-signal components; an output circuit coupled to at least one of said plurality of plate electrodes and to said second scanning system for translating said field-frequency synchronizing-signal components thereto; means coupled to said first scanning system for applying to a pair of said plurality of plate electrodes oppositely phased comparison signals in fixed phase relation with said line-frequency scansion; an output circuit coupled to said pair of plate electrodes for developing a first unidirectional control signal indicative of the instantaneous phase relation between said line-frequency synchronizing-signal components and said line-frequency scansion; means for utilizing said first control signal to effect phase synchronism of said first scanning system with said line-frequency synchronizing-signal components; means for energizing another of said plate electrodes to accept at least a portion of the space current directed thereto; an output circuit coupled to said additional plate electrode for developing a second unidirectional control signal indicative of the instantaneous amplitude of said composite video signals; and means for applying said second control signal to said receiving circuits to effect automatic gain control of said receiver.

7. In a television receiver for utilizing transmitted composite television signals: an image-reproducing device; a scanning system for controlling the scansion of said device; receiving circuits for translating said composite television signals; a video detector for demodulating said translated composite television signals to provide composite video signals comprising video-signal components and synchronizing-signal components of amplitude greater than the maximum amplitude of said video-signal components; a beam deflection tube comprising an electron gun including an elongated cathode for projecting a sheet-like electron beam of substantially rectangular cross-section, a plurality of plate electrodes respectively having predetermined receptive areas, anode means for collecting space electrons not collected by said plate electrodes, and deflection-control means for normally directing said electron beam to said anode means and responsive to an input signal for subjecting said beam to a transverse deflection field; means coupled to said video detector for applying said composite video signals to said deflection-control means to cause transverse deflection of said beam at least partially onto said receptive areas in response to said synchronizing-signal components; a deflection-control electron-discharge device comprising means for projecting another electron beam, a pair of anodes having active portions on opposite sides of the undeflected path of said other beam, and a deflection-control system for subjecting said other beam to a transverse deflection field; an output circuit coupled to one of said anodes and to said scanning system; means coupled to said scanning system for applying to said deflection-control system a feedback signal in synchronism with said scansion; means coupled to said scanning system for applying to a pair of said plate electrodes oppositely phased comparison signals in fixed phase relation with said scansion; an output circuit coupled to said pair of plate electrodes for developing a first unidirectional control signal indicative of the instantaneous phase relation between said synchronizing-signal components and said scansion; means for applying said first control signal to said deflection-control system to effect phase synchronism of said scanning system with said synchronizing-signal components; means for energizing another of said plate electrodes to accept at least a portion of the space current directed thereto; an output circuit coupled to said other plate electrode for developing a second unidirectional control signal indicative of the instantaneous amplitude of said composite video signals; and means for applying said second control signal to said receiving circuits to effect automatic gain control of said receiver.

8. In a television receiver for utilizing transmitted composite television signals: an image-reproducing device; a scanning system for controlling the scansion of said device; receiving circuits for translating said composite television signals; a video detector for demodulating said translated composite television signals to provide composite video signals comprising video-signal components and synchronizing-signal components of amplitude greater than the maximum amplitude of said video-signal components; a beam deflection tube comprising an electron gun including an elongated cathode for projecting a sheet-like electron beam of substantially rectangular cross-section, a plurality of plate electrodes respectively having predetermined receptive areas, anode means for collecting space electrons not collected by said plate electrodes, and deflection-control means for normally directing said electron beam to said anode means and responsive to an input signal for subjecting said beam to a transverse deflection field; means coupled to said video detector for applying said composite video signals to said deflection-control means to cause transverse deflection of said beam at least partially onto said receptive areas in response to said synchronizing-signal components; a deflection-control electron-discharge device comprising means for projecting another electron beam, a pair of anodes having active portions on opposite sides of the undeflected path of said other beam, and a pair of electrostatic-deflection electrodes for subjecting said other beam to a transverse deflection field; an output circuit coupled to one of said anodes and to said scanning system; means coupled to said scanning system for applying to said electrostatic-deflection electrodes a feedback signal in synchronism with said scansion; means coupled to said scanning system for applying to a pair of said plate electrodes oppositely phased comparison signals in fixed phase relation with said scansion; an output circuit coupled to said pair of plate electrodes for developing a first unidirectional control signal indicative of the instantaneous phase relation between said synchronizing-signal components and said scansion; means for applying said first control signal to said electrostatic-deflection electrodes to effect phase synchronism of said scanning system with said synchronizing-signal components; means for energizing another of said plate electrodes to accept at least a portion of the space current directed thereto; an output circuit coupled to said other plate electrode for developing a second unidirectional control signal indicative of the instantaneous amplitude of said composite video signals; and means for applying said second control signal to said receiving circuits to effect automatic gain control of said receiver.

9. In a television receiver for utilizing transmitted composite television signals: an image-reproducing device; a scanning system for controlling the scansion of said device; receiving circuits for translating said composite television signals; a video detector for demodulating said translated composite television signals to provide composite video signals comprising video-signal components and synchronizing-signal components of amplitude greater than the maximum amplitude of said video-signal components; a beam deflection tube comprising an electron gun including an elongated cathode for projecting a sheet-like electron beam of substantially rectangular cross-section, a plurality of plate electrodes respectively having predetermined receptive areas, anode means for collecting space electrons not collected by said plate electrodes, and deflection-control means for normally directing said electron beam to said anode means and responsive to an input signal for subjecting said beam to a transverse deflection field; means coupled to said video detector for applying said composite video signals to said deflection-control means to cause transverse deflection of said beam at least partially onto said receptive areas in response to said synchronizing-signal components; a deflection-control electron-discharge device comprising means for projecting another electron beam, a pair of anodes having active portions on opposite sides of the undeflected path of said other beam, and a pair of electrostatic-deflection electrodes, electrically connected respectively to a pair of said plate electrodes, for subjecting said other beam to a transverse deflection field; an output circuit coupled to one of said anodes and to said scanning system; means coupled to said scanning system for applying to said pair of plate electrodes and to said electrostatic-deflection electrodes oppositely phased comparison signals in fixed phase relation with said scansion; an output circuit coupled to said pair of plate electrodes for developing a first unidirectional control signal indicative of the instantaneous phase relation between said synchronizing-signal components and said scansion and for applying said first control signal to said electrostatic-deflection electrodes to effect phase synchronism of said scanning system with said synchronizing-signal components; means for energizing another of said plate electrodes to accept at least a portion of the space current directed thereto; an output circuit coupled to said other plate electrode for developing a second undirectional control signal indicative of the instantaneous amplitude of said composite video signals; and means for applying said second control signal to said receiving circuits to effect automatic gain control of said receiver.

10. In a television receiver for utilizing transmitted composite television signals: an image-reproducing device; a first scanning system for controlling the line-frequency scansion of said device; a second scanning system for controlling the field-frequency scansion of said device; receiving circuits for translating said composite television signals; a video detector for demodulating said translated composite television signals to provide composite video signals comprising video-signal components and line-frequency and field-frequency synchronizing-signal components of amplitude greater than the maximum amplitude of said video-signal components; a beam deflection tube comprising an electron gun including an elongated cathode for projecting a sheet-like electron beam of substantially rectangular cross-section, a plurality of plate electrodes respectively having predetermined receptive areas, anode means for collecting space electrons not collected by said plate electrodes, and deflection-control means for normally directing said electron beam to said anode means and responsive to an input signal for subjecting said beam to a transverse deflection field; means coupled to said video detector for applying said composite video signals to said deflection-control means to cause transverse deflection of said beam at least partially onto said receptive areas in response to said synchronizing-signal components; an output circuit coupled to at least one of said plate electrodes and to said second scanning system for translating said field-frequency synchronizing-signal components thereto; a deflection-control electron-discharge device comprising means for projecting another electron beam, a pair of anodes having active portions on opposite sides of the undeflected path of said other beam, and a pair of electrostatic-deflection electrodes, directly connected respectively to a pair of said plate electrodes, for subjecting said other beam to a transverse deflection field; an output circuit coupled to one of said anodes and to said first scanning system; means coupled to said first scanning system for applying to said pair of plate electrodes and to said electrostatic-deflection electrodes oppositely phased comparison signals in fixed phase relation with said line-frequency scansion; an output circuit coupled to said pair of plate electrodes for developing a first unidirectional control signal indicative of the instantaneous phase relation between said line-frequency synchronizing-signal components and said line-frequency scansion and for applying said first control signal to said electrostatic-deflection electrodes to effect phase synchronism of said first scanning system with said line-frequency synchronizing-signal components; means for energizing another of said plate electrodes to accept at least a portion of the space current directed thereto; an output circuit coupled to said other plate electrode for developing a second unidirectional control signal indicative of the instantaneous amplitude of said composite video signals; and means for applying said second control signal to said receiving circuits to effect automatic gain control of said receiver.

11. In a television receiver for utilizing transmitted composite television signals: an image-reproducing device; a first scanning system for controlling the line-frequency scansion of said device; a second scanning system for controlling the field-frequency scansion of said device; receiving circuits for translating said composite television signals; a video detector for demodulating said translated composite television signals to provide composite video signals comprising video-signal components and line-frequency and field-frequency synchronizing-signal components of amplitude greater than the maximum amplitude of said video-signal components; a beam deflection tube comprising an electron gun including an elongated cathode for projecting a sheet-like electron beam of substantially rectangular cross-section, an anode having two apertures in overlapping alignment in a direction parallel to said cathode, a plurality of plate electrodes for collecting space electrons passing through one of said apertures, an additional plate electrode for collecting space electrons passing through the other of said apertures, and deflection-control means for normally directing said electron beam to an electron-impervious portion of said anode and responsive to an input signal for subjecting said beam to a transverse deflection field; means coupled to said video detector for applying said composite video signals to said deflection-control means to cause transverse deflection of a longitudinal portion of said beam entirely into said one aperture and of another longitudinal portion of said beam partially into the other of said apertures in response to said synchronizing-signal components; an output circuit coupled to at least one of said plurality of plate electrodes and to said second scanning system for translating said field-frequency synchronizing-signal components thereto; a deflection-control electron-discharge device comprising means for projecting another electron beam, a pair of anodes having active portions on opposite sides of the undeflected path of said other beam, and a pair of electrostatic-deflection electrodes, directly connected respectively to a pair of said plurality of plate electrodes, for subjecting said other beam to a transverse deflection field; an output circuit coupled to one of said anodes and to said first scanning system; means coupled to said first scanning system for applying to said pair of plate electrodes and to said electrostatic-deflection electrodes oppositely phased comparison signals in fixed phase relation with said line-frequency scansion; an output circuit coupled to said pair of plate electrodes for developing a first unidirectional control signal indicative of the instantaneous phase relation between said line-frequency synchronizing-signal components and said line-frequency scansion and for applying said first control signal to said electrostatic-deflection electrodes to effect phase synchronism of said first scanning system with said line-frequency synchronizing-signal components; means for energizing another of said plate electrodes to accept at least a portion of the space current directed thereto; an output circuit coupled to said other plate electrode for developing a second unidirectional control signal indicative of the instantaneous amplitude of said composite video signals; and means for applying said second control signal to said receiving circuits to effect automatic gain control of said receiver.

12. In a television receiver for utilizing transmitted composite television signals: an image-reproducing device; a first scanning system for controlling the line-frequency scansion of said device; a second scanning system for controlling the field-frequency scansion of said device; receiving circuits for translating said composite television signals; a video detector for demodulating said translated composite television signals to provide composite video signals comprising video-signal components and line-frequency and field-frequency synchronizing-signal components of amplitude greater than the maximum amplitude of said video-signal components; a beam deflection tube comprising means including at least one elongated cathode for projecting two separate sheet-like electron beams of substantially rectangular cross-section, a plurality of plate electrodes respectively having predetermined receptive areas transversely disposed with respect to the path of one of said beams, anode means for collecting space electrons of said one beam not collected by said plate electrodes, deflection-control means for normally directing said one beam to said anode means and responsive to an input signal for subjecting said one beam to a transverse deflection field, a pair of anodes having active portions on opposite sides of the undeflected path of the other of said beams, and a deflection-control system for subjecting said other beam to a transverse deflection field; means coupled to said video detector for applying said composite video signals to said deflection-control means to cause transverse deflection of said one beam at least partially onto said receptive areas in response to said synchronizing-signal components; an output circuit coupled to at least one of said plate electrodes and to said second scanning system for translating said field-frequency synchronizing-signal components thereto; an output circuit coupled to one of said anodes and to said first scanning system; means coupled to said first scanning system for applying to a pair of said plate electrodes oppositely phased comparison signals in fixed phase relation with said line-frequency scansion; an output circuit coupled to said pair of plate electrodes for developing a first unidirectional control signal indicative of the instantaneous phase relation between said line-frequency synchronizing-signal components and said line-frequency scansion; means for applying said first control signal to said deflection-control system to effect phase synchronism of said first scanning system with said line-frequency synchronizing-signal components; means for energizing another of said plate electrodes to accept at least a portion of the space current directed thereto; an output circuit coupled to said other plate electrode for developing a second unidirectional control signal indicative of the instantaneous amplitude of said composite video signals; and means for applying said second control signal to said receiving circuits to effect automatic gain control of said receiver.

13. In a television receiver for utilizing transmitted composite television signals: an image-reproducing device; a first scanning system for controlling the line-frequency scansion of said device; a second scanning system for controlling the field-frequency scansion of said device; receiving circuits for translating said composite television signals; a video detector for demodulating said translated composite television signals to provide composite video signals comprising video-signal components and line-frequency and field-frequency synchronizing-signal components of amplitude greater than the maximum amplitude of said video-signal components; a beam deflection tube comprising means including at least one elongated cathode for projecting two separate sheet-like electron beams of substantially rectangular cross-section, a plurality of plate electrodes respectively having predetermined receptive areas transversely disposed with respect to the path of one of said beams, anode means for collecting space electrons of said one beam not collected by said plate electrodes, deflection-control means for normally directing said one beam to said anode means and responsive to an input signal for subjecting said one beam to a transverse deflection field, a pair of anodes having active portions on opposite sides of the undeflected path of the other of said beams, and a pair of electrostatic-deflection electrodes directly connected respectively to a pair of said plate electrodes, for subjecting said other beam to a transverse deflection field; means coupled to said video detector for applying said composite video signals to said deflection-control means to cause transverse deflection of said one beam at least partially onto said receptive areas in response to said synchronizing-signal components; an output circuit coupled to at least one of said plurality of plate electrodes and to said second scanning system for translating said field-frequency synchronizing-signal components thereto; an output circuit coupled to one of said anodes and to said first scanning system; means coupled to said first scanning system for applying to said pair of plate electrodes oppositely phased comparison signals in fixed phase relation with said line-frequency scansion; an output circuit coupled to said pair of plate electrodes for developing a first unidirectional control signal indicative of the instantaneous phase relation between said line-frequency synchronizing-signal components and said line-frequency scansion and for applying said first control signal to said electrostatic-deflection electrodes to effect phase synchronism of said first scanning system with said line-frequency synchronizing-signal components; means for energizing another of said plate electrodes to accept at least a portion of the space current directed thereto; an output circuit coupled to said other plate electrode for developing a second unidirectional control signal indicative of the instantaneous amplitude of said composite video signals; and means for applying said second control signal to said receiving circuits to effect automatic gain control of said receiver.

14. In a television receiver for utilizing transmitted composite television signals: an image-reproducing device; a first scanning system for controlling the line-frequency scansion of said device; a second scanning system for controlling the field-frequency scansion of said device; receiving circuits for translating said composite television signals; a video detector for demodulating said translated composite television signals to provide composite video signals comprising video-signal components and line-frequency and field-frequency synchronizing signal components of amplitude greater than the maximum amplitude of said video-signal components; a beam deflection tube comprising means including at least one elongated cathode for projecting two separate sheet-like electron beams of substantially rectangular cross-section, a plurality of plate electrodes respectively having predetermined receptive areas transversely disposed with respect to the path of one of said beams, anode means for collecting space electrons of said one beam not collected by said plate electrodes, deflection-control means for normally directing said one beam to said anode means and responsive to an input signal for subjecting said one beam to a transverse deflection field, a pair of anodes having active portions on opposite sides of the undeflected path of the other of said beams, and a pair of electrostatic-deflection electrodes, directly connected respectively to a pair of said plate electrodes for subjecting said other beam to a transverse deflection field; means coupled to said video detector for applying said composite video signals to said deflection-control means to cause transverse deflection of said one beam at least partially onto said receptive areas in response to said synchronizing-signal components; an output circuit coupled to at least one of said plurality of plate electrodes and to said second scanning system for translating said field-frequency synchronizing-signal components thereto; an output circuit coupled to one of said anodes and to said first scanning system; means coupled to said first scanning system for applying to said pair of said plate electrodes oppositely phased comparison signals in fixed phase relation with said line-frequency scansion; and an output circuit coupled to said pair of plate electrodes for developing a unidirectional control signal indicative of the instantaneous phase relation between said line-frequency synchronizing-signal components and said line-frequency scansion and for applying said control signal to said electrostatic-deflection electrodes to effect phase synchronism of said first scanning system with said line-frequency synchronizing-signal components.

No references cited.